(12) United States Patent
Li et al.

(10) Patent No.: US 9,656,574 B2
(45) Date of Patent: May 23, 2017

(54) ELECTRIC VEHICLE MOVING DIRECTION DETECTION

(71) Applicant: Robert Bosch GmbH, Stuttgart (DE)

(72) Inventors: Qingyuan Li, Ann Arbor, MI (US); Kevin Wu, Novi, MI (US); Ravikumar Bhadange, Novi, MI (US); Achim Frech, Talheim (DE); Aaron Saylor, Farmington, MI (US)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 14/557,652

(22) Filed: Dec. 2, 2014

(65) Prior Publication Data
US 2016/0152157 A1 Jun. 2, 2016

(51) Int. Cl.
| | |
|---|---|
| *B60L 15/00* | (2006.01) |
| *G07C 5/00* | (2006.01) |
| *B60L 15/20* | (2006.01) |
| *H02P 1/40* | (2006.01) |
| *B60L 3/12* | (2006.01) |
| *B60L 3/00* | (2006.01) |
| *B60L 7/14* | (2006.01) |
| *B60L 11/18* | (2006.01) |

(52) U.S. Cl.
CPC ........ *B60L 15/2054* (2013.01); *B60L 3/0046* (2013.01); *B60L 3/12* (2013.01); *B60L 7/14* (2013.01); *B60L 11/1872* (2013.01); *B60L 15/20* (2013.01); *H02P 1/40* (2013.01); *B60L 2240/30* (2013.01); *B60L 2240/32* (2013.01); *B60L 2240/421* (2013.01); *B60L 2240/423* (2013.01); *B60L 2240/461* (2013.01); *B60L 2260/22* (2013.01); *B60L 2260/24* (2013.01); *G07C 5/00* (2013.01); *Y02T 10/645* (2013.01); *Y02T 10/7275* (2013.01)

(58) Field of Classification Search
None
See application file for complete search history.

(56) References Cited

U.S. PATENT DOCUMENTS

| | | | |
|---|---|---|---|
| 6,577,948 | B1 | 6/2003 | Skellenger et al. |
| 8,285,436 | B2 | 10/2012 | Yoshii |

(Continued)

FOREIGN PATENT DOCUMENTS

| | | |
|---|---|---|
| DE | 102006054516 | 6/2007 |
| DE | 102012024573 | 6/2014 |

(Continued)

OTHER PUBLICATIONS

International Search Report and Written Opinion for Application No. PCT/EP2015/075070 dated Feb. 11, 2016 (11 pages).

*Primary Examiner* — Rami Khatib
*Assistant Examiner* — Gerrad A Foster
(74) *Attorney, Agent, or Firm* — Michael Best & Friedrich LLP (57) ABSTRACT

A method and system is provided for determining a direction of movement of an electric vehicle. The method and system includes determining the direction of rotation and the direction of torque of a motor shaft, determining an operating gear of the vehicle, and determining a previous direction of movement of the vehicle. The method and system then determines if the vehicle is moving forward or backwards. The method and system also determines whether the vehicle is motoring (i.e., converting electric power to mechanical power) or generating (i.e., converting mechanical power into electric power).

18 Claims, 5 Drawing Sheets

(56) References Cited

U.S. PATENT DOCUMENTS

| | | |
|---|---|---|
| 8,521,351 B2 | 8/2013 | Nakamura et al. |
| 2007/0219695 A1 | 9/2007 | Chiu et al. |
| 2010/0318255 A1 | 12/2010 | Li et al. |
| 2012/0053798 A1 | 3/2012 | Hirota et al. |

FOREIGN PATENT DOCUMENTS

| | | |
|---|---|---|
| EP | 1108605 | 8/2002 |
| JP | 2008224352 | 9/2008 |
| WO | 9418026 | 8/1994 |

ELECTRIC VEHICLE MOVING DIRECTION DETECTION

BACKGROUND

The present invention relates to an apparatus and a method of detecting the direction of movement of an electric vehicle.

SUMMARY

Modern automotive systems rely on computerized control systems to control the characteristics and performance of the vehicle. Increasingly sophisticated features are being proposed for modern vehicles, such as automatic parallel parking, emergency braking, and electronic stability control. In automatic parallel parking systems, emergency braking systems, electronic stability control systems, and other vehicle systems, there is a need to know the direction of movement of the vehicle. It is possible to determine the direction of movement of a vehicle using information provided by wheel speed sensors, motor shaft speed sensors, and motor shaft torque sensors.

Modern control systems use algorithms to control the sophisticated features of the vehicle. These features adjust the response and characteristics of the vehicle depending on the vehicle's desired performance. Vehicle control systems depend on information provided by sensors located throughout the vehicle. The control systems manage and utilize the information using computer-implemented methods.

In one embodiment, the invention provides a method for determining a direction of movement of an electric vehicle. The method includes determining a direction of torque on the motor shaft based on a signal from a torque sensor and a direction of rotation of the motor shaft based on a signal from a motor shaft speed sensor. Additionally, the method determines a currently selected operating gear of the electric vehicle. The method uses the determination of the operating gear and the speed sensors to determine that the electric vehicle is moving forward and sets a forward flag when the currently selected operating gear is a forward drive gear and the direction of rotation of the motor shaft and the direction of torque on the motor shaft are the same. The method also determines that the electric vehicle is moving in a forward direction when the currently selected operating gear is a forward drive gear, the direction of rotation of the motor shaft and the direction of torque on the motor shaft are not the same, and the forward flag is already set. The method includes determining that the electric vehicle is moving backward when the currently selected operating gear is a forward drive gear, the direction of rotation of the motor shaft and the direction of torque on the motor shaft are not the same, and the forward flag is not already set.

In another embodiment, the invention provides a system for determining a direction of movement of an electric vehicle by using a motor shaft speed sensor. The motor shaft speed sensor is located proximal to a motor shaft of the electric vehicle. A motor shaft torque sensor is located proximal to the motor shaft and configured to determine a direction of torque on the motor shaft. Additionally, the system includes a controller that is configured to determine a currently selected operating gear of the electric vehicle. The controller uses this information to determine that the electric vehicle is moving forward and setting a forward flag when the currently selected operating gear is a forward drive gear and the direction of rotation of the motor shaft and the direction of torque on the motor shaft are the same. The controller also determines that the electric vehicle is moving in a forward direction when the currently selected operating gear is a forward drive gear, the direction of rotation of the motor shaft and the direction of torque on the motor shaft are not the same, and the forward flag is already set. Additionally, the controller determines that the electric vehicle is moving backward when the currently selected operating gear is a forward drive gear, the direction of rotation of the motor shaft and the direction of torque on the motor shaft are not the same, and the forward flag is not already set.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components, may be utilized to implement the invention. As described in subsequent paragraphs, the specific configurations illustrated in the drawings are intended to exemplify embodiments of the invention and other alternative configurations are possible.

Figure 1:
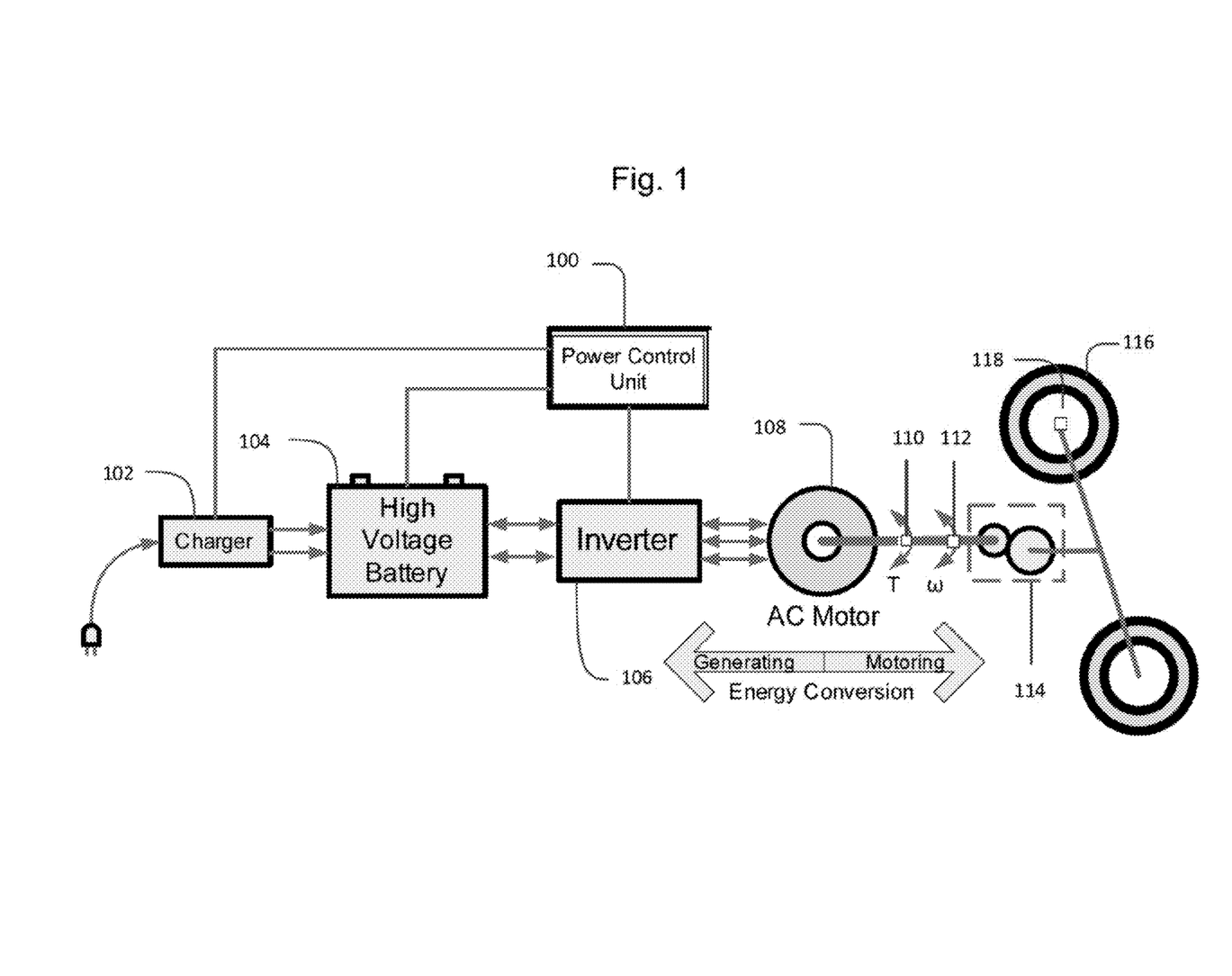
FIG. 1 is a block diagram of a drivetrain and a power system of an electric vehicle according to one embodiment.

FIG. 1 illustrates a drivetrain and power system 100 of an electric vehicle. A power control unit 101 provides the central control and logic to operate the power system 100 of the electric vehicle. The power control unit 101 monitors and controls the output of a battery charger 102. When charging, the charger 102 supplies direct current (DC) power to a high-voltage battery 104. The power control unit 101 monitors the charge level of the high-voltage battery 104, prevents the high-voltage battery 104 from being overcharged, and prevents overheating of the high-voltage battery 104.

An electric vehicle has two modes of operation. When accelerating, the vehicle is operating in a "motoring mode." In the motoring mode, the high-voltage battery 104 supplies power to the motor when the driver presses on the accelerator pedal. When braking, or in some embodiments when coasting, the vehicle is in a "generating mode." In the generating mode, slowing the vehicle reduces the vehicle's momentum and provides energy to charge the high-voltage battery 104.

In the motoring mode, the high-voltage battery 104 provides power to an inverter 106, which converts direct current (DC) into alternating current (AC) for the electric motor 108. The electric motor 108 converts the electric power into mechanical power and applies the mechanical power through a motor shaft and a transaxle assembly 114. The mechanical power is thereby transmitted to the wheels 116 to accelerate the vehicle. In the motoring mode, the torque and the rotational speed on the motor shaft have the same direction (i.e., $T \times \omega > 0$). In this process, the electric motor 108 generates torque and rotational speed on the output shaft of the electric motor 108. The torque and rotational speed of the shaft vary not only with the output power of the electric motor 108, but also on the driving conditions (e.g. road traction and road slope). A motor shaft torque sensor 110 measures the current torque value, and a motor shaft rotational speed sensor 112, measures the current rotational speed of the motor shaft.

A wheel speed sensor 118 is located proximal to one or more wheels and measures the rotational speed of the wheel. The wheel speed sensor 118 can be a standard design or an intelligent/active sensor. A standard wheel speed sensor provides a lower cost and can detect wheel speeds as low as 0.2 meters per second. Additionally, standard wheel speed sensors are faster than intelligent wheel speed sensors and can detect wheel direction in 4 to 5 counts as opposed to 7 counts.

In the generating mode, the electric motor 108 converts mechanical power (i.e., the momentum of the vehicle) into electrical power. This conversion decelerates the vehicle and recaptures part of the energy expended in the motoring mode. In the generating mode, the torque and the rotational speed on the motor shaft have the opposite direction (i.e., $T \times \omega < 0$). The inverter 106 converts the AC power generated by the electric motor 108 back into DC power for storage in the high-voltage battery 104. The generating mode occurs when a driver of a vehicle applies the brakes of the vehicle or in some embodiments, when the vehicle is coasting. The power control unit 100 manages the modes of operation and the interaction between components.

Figure 2:
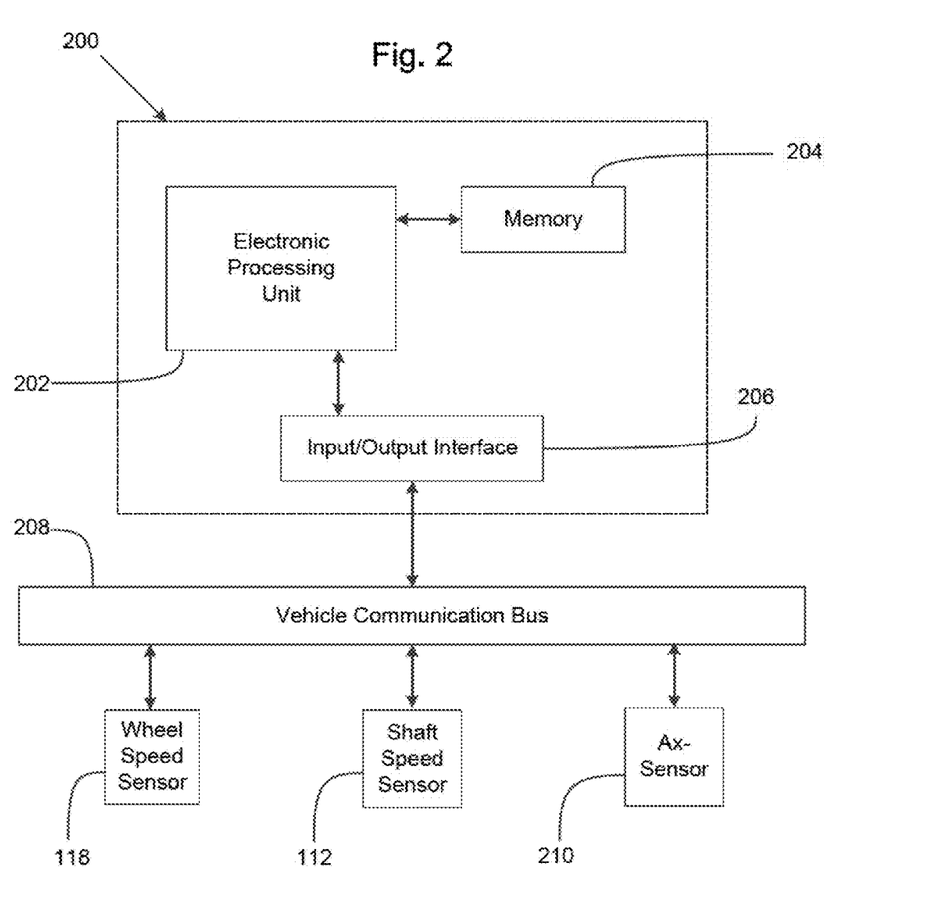
FIG. 2 is a block diagram of a control system of an electric vehicle with the drivetrain and power system of FIG. 1.

FIG. 2 illustrates a control circuit for monitoring and controlling the operation of the vehicle drivetrain and power system 100. A controller 200 includes an electronic processing unit 202, a non-transitory computer readable memory 204, and an input/output interface 206. The input/output interface 206 connects to the electronic processing unit 202 and communicates with vehicle sensors via a controller area network (CAN) bus 208. In various embodiments, the vehicle sensors connected to the CAN bus 208 may include a wheel speed sensor 210 for each wheel, a motor shaft rotational speed sensor 112, a motor shaft torque sensor 110, and a gear position sensor 216. The wheel speed sensors 210 are located proximal to each wheel and send wheel speed information to the controller 200. The motor shaft rotational speed sensor 112 is located proximal to the shaft of the electric motor 108 and sends the rotational speed information of the shaft of the electric motor 108 to the controller 200. Similarly, the motor shaft torque sensor 110 is located proximal to the shaft of the electric motor 108 and sends the torque information of the shaft of the electric motor 108 to the controller 200. The controller 200 is programmed to receive the sensor information and to perform a sequence of operations that utilize the sensor information to determine the direction of movement of the vehicle.

Figure 3:
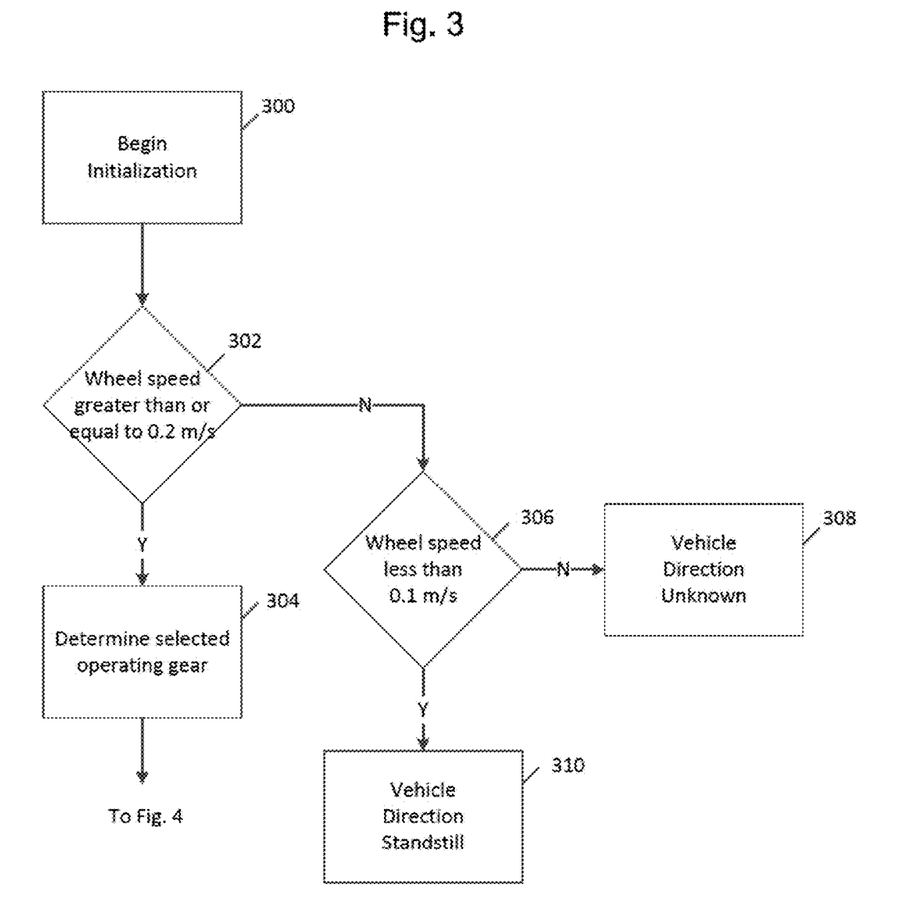
FIG. 3 is a flowchart of a method for initializing the control system for the direction of movement detection implemented by the control system of FIG. 2.
Figure 4:
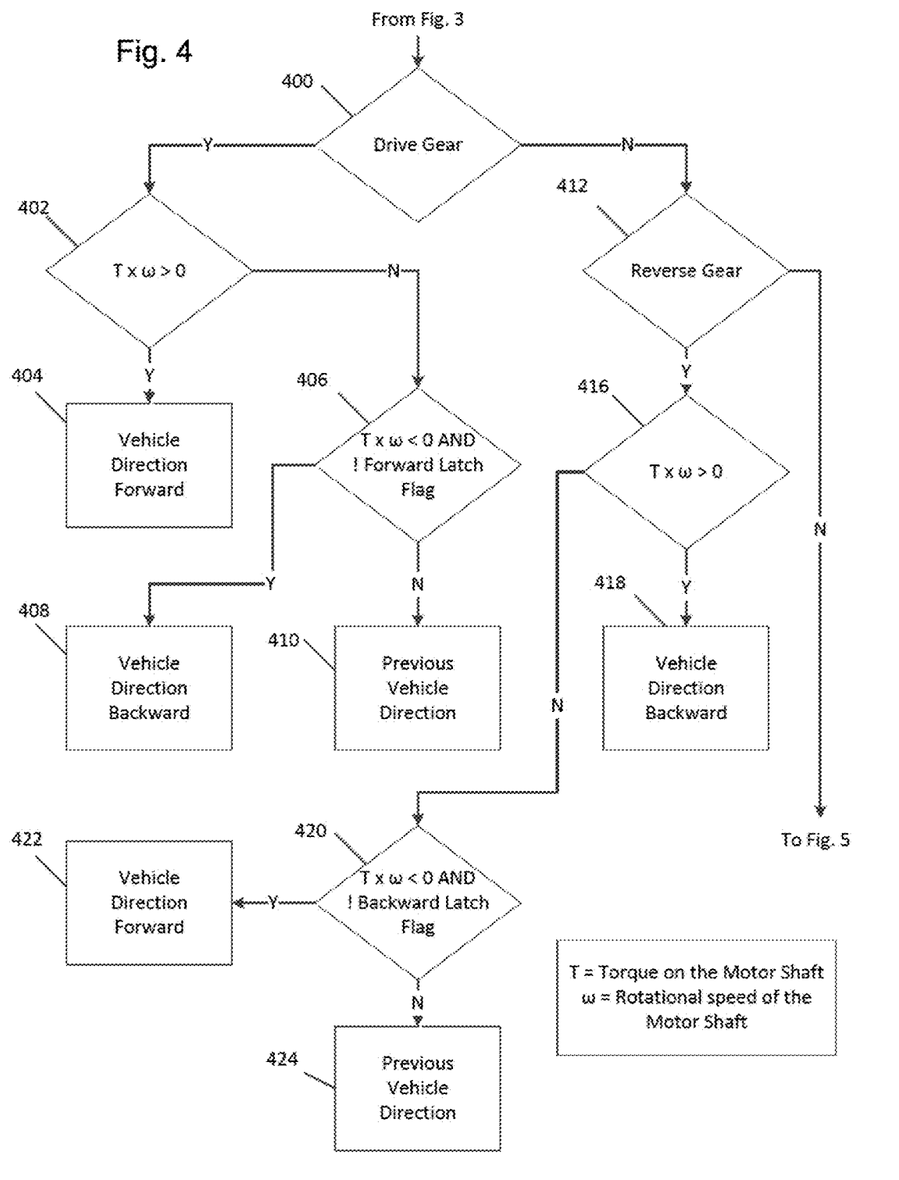
FIG. 4 is a flowchart of a method for detecting a direction of movement implemented by the control system of FIG. 2 while the vehicle is in the drive gear or the reverse gear.
Figure 5:
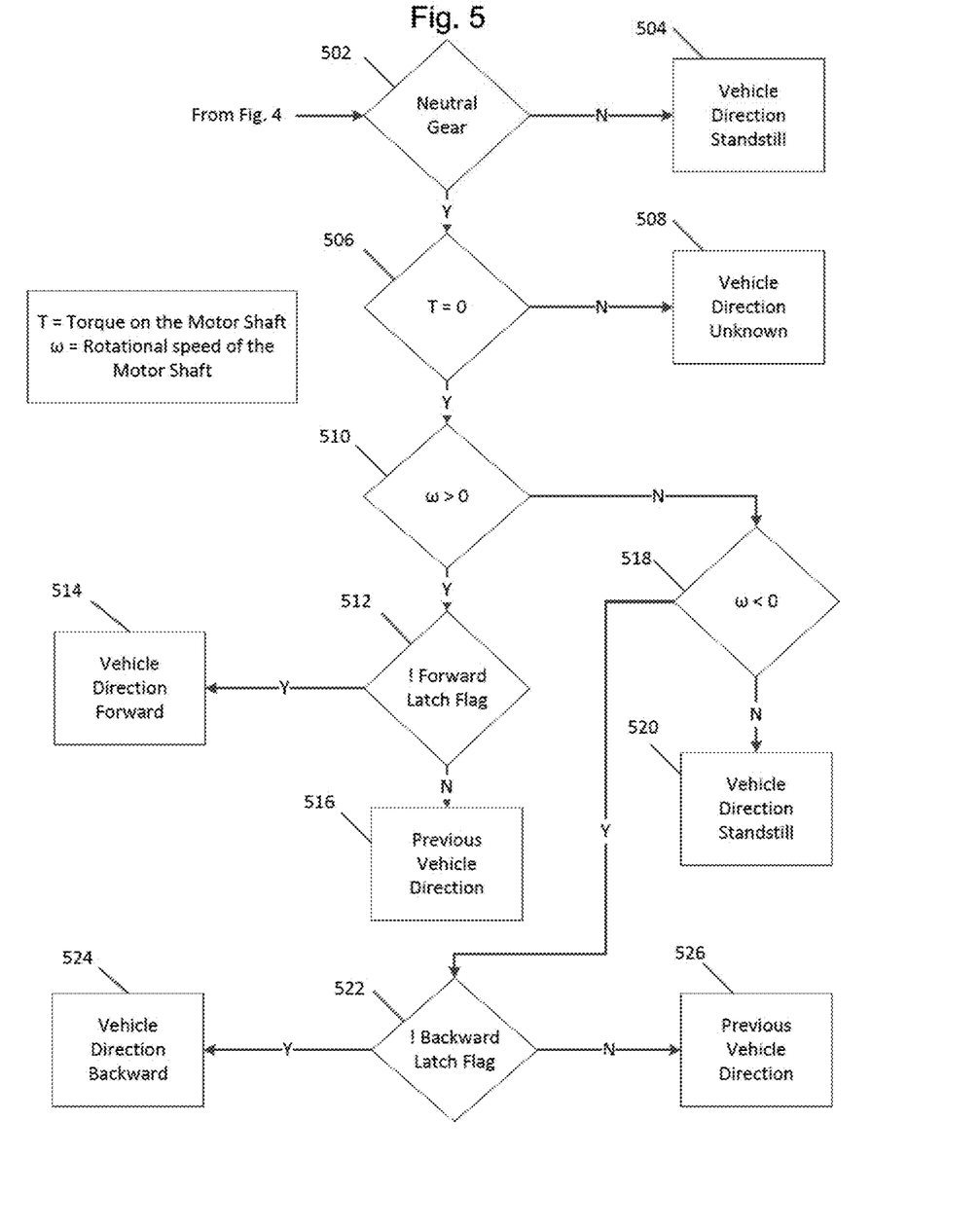
FIG. 5 is a flowchart of a method for detecting a direction of movement implemented by the control system of FIG. 2 when the vehicle is in the neutral gear.

FIGS. 3-5 illustrate the methods for detecting the direction of vehicle movement for each gear position by using the system illustrated in FIGS. 1 and 2. The method uses state flags to hold information, which are stored in the non-transitory computer-readable memory 204. The state flags include a vehicle direction indicator, a forward latch flag, and a backward latch flag. The vehicle direction indicator can be set to forward, backward, or unknown, and the forward and backward latch flags can be set to true or false. The state flags are set on certain conditions within the logic of the controller 200. The vehicle direction indicator is the principle output from the direction of movement method and is utilized in other control systems. The method continuously loops through the steps in FIGS. 3-5.

FIG. 3 illustrates the beginning of the control program. After each step of the control program without a step immediately following, the control program starts back at initialization (step 300). At the first initialization (i.e., vehicle startup), the direction of movement of the vehicle is unknown. The non-transitory computer readable memory 204 stores a vehicle direction indicator as unknown, a forward latch flag as false, and a reverse latch flag as false. During a first speed check (step 302), the controller 200 checks whether all of the wheels of the vehicle have a rotational speed of greater than or equal to a threshold (e.g., 0.2 meters per second). If true, the controller 200 determines which operating gear is selected (step 304) and continues its analysis based on the selected operating gear.

However, if any wheel is rotating at a speed less than the threshold (in this example, 0.2 meters per second), the controller 200 performs a second speed check (step 306), which checks whether all of the wheels of the vehicle have a rotational speed of less than a second, lower threshold (in this example, 0.1 m/s). If the wheel speeds are less than the second threshold, the controller 200 determines that the vehicle is stationary. It sets the vehicle direction indicator to standstill, the forward latch flag to false, and the backward latch flag to false (step 310). If the wheel speed of any wheel is greater than the second threshold, the controller is unable to conclude that the vehicle is stationary, but cannot accurately determine whether it is moving forward or backward. Therefore, the controller 200 sets the vehicle direction indicator to unknown, the forward latch flag to false, and the backward latch flag to false (step 308).

Once the controller has determined that the wheel speeds are greater than the first threshold and has identified the currently selected operating gear of the vehicle, it then varies its operation depending on the currently selected operating gear. As illustrated in FIG. 4, if the gear position is in drive (step 400), the controller 200 determines whether the product of the shaft speed and the shaft torque is positive (i.e., both values are positive or both values are negative) (step 402). If the product of the shaft speed and the shaft torque is positive, the controller 200 determines that the vehicle is in a "motoring mode" and moving in the forward direction. It sets the vehicle direction indicator to forward and the forward latch flag as true (step 404). If the product of the shaft speed and the shaft torque is less than zero (i.e., one positive and the other negative) and the forward latch flag is not true (step 406), then the controller 200 determines that the vehicle is rolling backwards despite being in a drive gear. The controller sets the vehicle direction indicator to backward and sets the backward latch flag to true (step 408). Alternatively, if the product of the shaft speed and shaft torque is not less than zero or the forward latch flag is true, then the controller determines that the vehicle is coasting or braking and the controller 200 makes no change to the previous vehicle direction indicator nor does it alter the state of the forward latch flag (step 410).

If the controller 200 detects that the vehicle is not operating in a drive gear (step 400) and not operating in a reverse gear (step 412), then the controller 200 determines that the vehicle is operating in either a neutral gear or a parking gear (FIG. 5). Conversely, If the controller 200 detects the vehicle is operating in a reverse gear (step 412), the controller 200 determines whether the product of the shaft torque and the shaft speed is greater than zero (i.e., both positive or both negative) (step 416), then the controller 200 determines that the vehicle is operating backwards in a motoring mode. It sets the vehicle direction indicator to backward and the backward latch flag to true (step 418). However, if the product is not greater than zero (i.e., one value is positive and the other negative) (step 416), the controller 200 evaluates whether the backward latch flag is set (step 420). If the product of the shaft torque and the shaft speed is less than zero (i.e., one value positive and the other negative) and the backward latch flag is not already set to "true," then the controller 200 determines that the vehicle is moving forward despite currently being operated in a reverse gear. The controller sets the vehicle direction indicator to forward and the forward latch flag to true (step 422). Conversely, if the backward latch flag is true or the product of the shaft torque and the shaft speed is not less than zero, then the controller determines that the vehicle is braking or coasting in the reverse direction. The controller makes no change to the previously designated direction nor does it alter the backward latch flag (step 424).

As illustrated in FIG. 5, if the vehicle is not operating in a forward gear, a reverse gear, or a neutral gear (step 502), the controller determines that the vehicle is in a parking gear and the controller 200 sets the vehicle direction indicator to standstill and the forward and backward latch flags to false (step 504). When operating in the neutral gear, there should be no torque on the drive shaft. However, the shaft may still be rotating if the vehicle is coasting or rolling either forward or backward. If the gear is in neutral (step 502) and the shaft torque is not zero (step 506), the controller 200 is unable to accurately determine the moving direction and sets the vehicle direction indicator to unknown and the forward and backward latch flags to false (step 508). If the shaft torque is equal to zero (step 506) and the shaft speed is greater than zero (step 510), the controller 200 determines that the vehicle is rolling, coasting, or braking in the forward direction. If the forward latch flag is not already set to true (step 512), the controller 200 sets the vehicle direction indicator to forward and the forward latch flag to true (step 514). Conversely, if the forward latch flag is already set to true (step 512), the controller 200 keeps the previous direction and latch flag settings (step 516).

If the gear position is neutral (step 502), the shaft torque is zero (step 506), and the shaft speed is not greater than zero (step 510), then the controller 200 checks if the shaft speed is less than zero (step 518). If the shaft speed is equal to zero, the vehicle is not moving and the controller 200 sets the vehicle direction indicator to standstill and the forward and backward latch flags to false (step 520). If the shaft speed is less than zero 518, the controller 200 determines that the vehicle is coasting, rolling, or braking in the reverse direction. If the backward latch flag is not already set to true (step 522), the controller 200 sets the vehicle direction indicator to backward and the backward latch flag to true (step 524). If the backward latch flag is already set to true 522, the controller 200 keeps the previous direction and latch flag settings (step 526).

Thus, the invention provides, among other things, a system, a controller, and a method for determining a direction of movement of a vehicle using electric motor shaft sensors. Various features and advantages of the invention are set forth in the following claims.

What is claimed is:

1. A method for determining a direction of movement of an electric vehicle, the method comprising:
    determining a direction of rotation of a motor shaft based on a signal from a rotational speed sensor;
    determining a direction of torque on the motor shaft based on a signal from a torque sensor;
    determining a currently selected operating gear of the electric vehicle;
    receiving a wheel speed value from at least one wheel speed sensor;
    determining that the electric vehicle is moving forward and setting a forward latch flag when the currently selected operating gear is a forward drive gear and the direction of rotation of the motor shaft and the direction of torque on the motor shaft are the same;
    comparing the wheel speed value from the at least one wheel speed sensor to a threshold;
    clearing the forward latch flag when the wheel speed value from the at least one wheel speed sensor is less than the threshold; and
    determining that the electric vehicle is moving forward when the currently selected operating gear is the forward drive gear, the direction of rotation of the motor shaft and the direction of torque on the motor shaft are not the same, and the forward latch flag is already set.

2. The method of claim 1, further comprising:
    determining that the electric vehicle is moving backward and setting a backward latch flag when the currently selected operating gear is a reverse gear and the direction of rotation of the motor shaft and the direction of torque on the motor shaft are the same;
    determining that the electric vehicle is moving backward when the currently selected operating gear is a reverse gear, the direction of rotation of the motor shaft and the direction of torque on the motor shaft are not the same, and the backward latch flag is already set; and
    determining that the electric vehicle is moving forward when the currently selected operating gear is a reverse gear, the direction of rotation of the motor shaft and the direction of torque on the motor shaft are not the same, and the backward latch flag is not already set.

3. The method of claim 2, further comprising:
    clearing the forward latch flag and the backward latch flag when the wheel speed value from the at least one wheel speed sensor is less than the threshold.

4. The method of claim 1, further comprising:
    determining that the electric vehicle is moving forward and setting the forward latch flag when the currently selected operating gear is a neutral gear and the direction of rotation of the motor shaft indicates that the vehicle is moving forward and the forward latch flag is not already set;
    determining that the electric vehicle is moving forward when the currently selected operating gear is the neutral gear and the direction of rotation of the motor shaft indicates that the vehicle is moving forward and the forward latch flag is set;
    determining that the electric vehicle is moving backward and setting the backward latch flag when the currently selected operating gear is the neutral gear and the direction of rotation of the motor shaft indicates that the vehicle is moving backward and the backward latch flag is not set; and determining that the electric vehicle is moving backward when the currently selected operating gear is the neutral gear and the direction of rotation of the motor shaft indicates that the vehicle is moving backward and the backward latch flag is not already set.

5. The method of claim 1, further comprising:
multiplying a value indicative of the torque of the motor shaft by a value indicative of a rotational speed of the motor shaft to get a third value; and
determining that the direction of rotation of the motor shaft and the direction of torque on the motor shaft are the same when a product of the multiplication is greater than zero; and
determining that the direction of rotation of the motor shaft and the direction of torque on the motor shaft are not the same when the product of the multiplication is less than zero.

6. The method of claim 1, further comprising:
determining that the vehicle is operating in a motoring mode when the currently selected operating gear is the forward drive gear and the direction of rotation of the motor shaft and the direction of torque on the motor shaft are the same; and
determining that the vehicle is operating in a generating mode when the currently selected operating gear is the forward drive gear, the direction of rotation of the motor shaft and the direction of torque on the motor shaft are not the same, and the forward latch flag is already set.

7. The method of claim 6, further comprising:
determining that the vehicle is operating in the generating mode when the currently selected operating gear is the forward drive gear, the direction of rotation of the motor shaft and the direction of torque on the motor shaft are not the same, and the forward latch flag is not already set.

8. The method of claim 1, wherein the direction of rotation and the direction of torque are not the same when the torque is equal to zero and the direction of rotation is either positive or negative.

9. The method of claim 1, further comprising determining that the electric vehicle is moving backward when the currently selected operating gear is a forward drive gear, the direction of rotation of the motor shaft and the direction of torque on the motor shaft are not the same, and the forward latch flag is not already set.

10. A system for determining a direction of movement of an electric vehicle, the system comprising:
a motor shaft speed sensor located proximal to a motor shaft of the electric vehicle configured to determine a direction of rotation of the motor shaft;
a motor shaft torque sensor located proximal to the motor shaft configured to determine a direction of torque on the motor shaft;
a wheel seed sensor located proximal to at least one wheel of the electric vehicle and configured to determine a wheel speed value;
a controller that is configured to
determine a currently selected operating gear of the electric vehicle;
set a forward latch flag when the currently selected operating gear is a forward drive gear and the direction of rotation of the motor shaft and the direction of torque on the motor shaft are the same;
compare the wheel speed value to a threshold;
clear the forward latch flag when the wheel speed value is less than the threshold; and
determine that the electric vehicle is moving forward when the forward latch flag is set.

11. The system of claim 10, wherein the controller is further configured to
determine that the electric vehicle is moving backward and setting a backward latch flag when the currently selected operating gear is a reverse gear and the direction of rotation of the motor shaft and the direction of torque on the motor shaft are the same;
determine that the electric vehicle is moving backward when the currently selected operating gear is the reverse gear, the direction of rotation of the motor shaft and the direction of torque on the motor shaft are not the same, and the backward latch flag is already set; and
determine that the electric vehicle is moving forward when the currently selected operating gear is the reverse gear, the direction of rotation of the motor shaft and the direction of torque on the motor shaft are not the same, and the backward latch flag is not already set.

12. The system of claim 10, wherein the controller is further configured to
clear the forward latch flag and the backward latch flag when the wheel speed value from the at least one wheel speed sensor is less than the threshold.

13. The system of claim 10, wherein the controller is further configured to
determine that the electric vehicle is moving forward and setting the forward flag when the currently selected operating gear is a neutral gear and the direction of rotation of the motor shaft indicates that the vehicle is moving forward and the forward latch flag is not already set;
determine that the electric vehicle is moving forward when the currently selected operating gear is the neutral gear and the direction of rotation of the motor shaft indicates that the vehicle is moving forward and the forward latch flag is set;
determine that the electric vehicle is moving backward and setting a backward latch flag when the currently selected operating gear is a neutral drive gear and the direction of rotation of the motor shaft indicates that the vehicle is moving in the backward direction and the backward latch flag is not set; and
determine that the electric vehicle is moving backward when the currently selected operating gear is the neutral gear and the direction of rotation of the motor shaft indicates that the vehicle is moving in the backward direction and the backward latch flag is not already set.

14. The system of claim 10, wherein the controller is further configured to
multiply a value, indicative of the torque of the motor shaft by a value indicative of a rotational speed of the motor shaft to get a third value; and
determine that the direction of rotation of the motor shaft and the direction of torque on the motor shaft are the same when a product of the multiplication is greater than zero; and
determine that the direction of rotation of the motor shaft and the direction of torque on the motor shaft are not the same when the product of the multiplication is less than zero.

15. The system of claim 10, wherein the controller is further configured to
determine that the vehicle is operating in a motoring mode when the currently selected operating gear is the forward drive gear and the direction of rotation of the motor shaft and the direction of torque on the motor shaft are the same; and determine that the vehicle is operating in a generating mode when the currently selected operating gear is the forward drive gear, the direction of rotation of the motor shaft and the direction of torque on the motor shaft are not the same, and the forward latch flag is already set.

16. The system of claim 15, wherein the controller is further configured to determine that the vehicle is operating in the generating mode when the currently selected operating gear is the forward drive gear, the direction of rotation of the motor shaft and the direction of torque on the motor shaft are not the same, and the forward latch flag is not already set.

17. The system of claim 10, wherein the controller is further configured to:

determine that the electric vehicle is moving forward when the currently selected operating gear is the forward drive gear and the direction of rotation of the motor shaft and the direction of torque on the motor shaft are not the same only when the forward latch flag has already been set in response to previously detecting that the rotation of the motor shaft and the direction of torque on the motor shaft are the same.

18. The system of claim 17, wherein the controller is further configured to:

determine that the electric vehicle is moving backward when the currently selected operating gear is the forward drive gear, the direction of rotation of the motor shaft and the direction of torque on the motor shaft are not the same, and the forward latch flag is not set.

* * * * *